(12) United States Patent
Hamada et al.

(10) Patent No.: US 8,045,580 B2
(45) Date of Patent: Oct. 25, 2011

(54) BAND CONTROL METHOD AND COMMUNICATION APPARATUS

(75) Inventors: Yasuhiro Hamada, Tokyo (JP); Keiichi Ohata, Tokyo (JP); Kenichi Maruhashi, Tokyo (JP); Takao Morimoto, Tokyo (JP); Masaharu Ito, Tokyo (JP); Shuya Kishimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 347 days.

(21) Appl. No.: 11/910,572

(22) PCT Filed: Mar. 30, 2006

(86) PCT No.: PCT/JP2006/306630
§ 371 (c)(1),
(2), (4) Date: Aug. 6, 2008

(87) PCT Pub. No.: WO2006/106808
PCT Pub. Date: Oct. 12, 2006

(65) Prior Publication Data
US 2009/0238206 A1 Sep. 24, 2009

(30) Foreign Application Priority Data
Apr. 4, 2005 (JP) .................................. 2005-108043

(51) Int. Cl.
*H04J 3/16* (2006.01)
(52) U.S. Cl. ........ 370/468; 370/229; 370/228; 370/232; 370/252; 370/352; 370/329; 370/431; 375/132; 455/62
(58) Field of Classification Search .................. None
See application file for complete search history.

(56) References Cited

U.S. PATENT DOCUMENTS

| | | | | |
|---|---|---|---|---|
| 5,673,253 A | * | 9/1997 | Shaffer | 370/229 |
| 6,122,291 A | * | 9/2000 | Robinson et al. | 370/468 |
| 6,404,806 B1 | * | 6/2002 | Ginesi et al. | 375/222 |
| 2001/0032334 A1 | * | 10/2001 | Dapper et al. | 725/105 |
| 2001/0043656 A1 | * | 11/2001 | Koslar et al. | 375/271 |

(Continued)

FOREIGN PATENT DOCUMENTS

JP 9-135263 A 5/1997
(Continued)

OTHER PUBLICATIONS

Communication issued Feb. 8, 2011 in counterpart Japanese Application No. 2007-512838.

*Primary Examiner* — Hassan Phillips
*Assistant Examiner* — Ajay Cattungal
(74) *Attorney, Agent, or Firm* — Sughrue Mion, PLLC

(57) ABSTRACT

The present invention intends to improve communication efficiency between two communication apparatuses each engaged in the communication by full duplex communication method by using a surplus band of the one to transmission band of the other. A first bandwidth required by a first communication apparatus (A) at data transmission and a second bandwidth required by a second communication apparatus (B) at data transmission are presumed. Next, the first bandwidth presumed as mentioned is compared to a first bandwidth used which the first communication apparatus (A) currently uses and at the same time, the second bandwidth presumed as mentioned is compared to a second bandwidth used which the second communication apparatus (B) currently uses. The first bandwidth and the second bandwidth are then adjusted, and a third bandwidth which the first communication apparatus (A) uses at data transmission and a fourth bandwidth which the second communication apparatus (B) uses are determined.

20 Claims, 8 Drawing Sheets

U.S. PATENT DOCUMENTS

| | | | |
|---|---|---|---|
| 2001/0050926 A1* | 12/2001 | Kumar | 370/529 |
| 2001/0050945 A1* | 12/2001 | Lindsey | 375/132 |
| 2001/0052830 A1* | 12/2001 | Noguchi et al. | 333/133 |
| 2002/0015210 A1* | 2/2002 | Fuse | 359/182 |
| 2002/0041587 A1* | 4/2002 | Reisinger et al. | 370/342 |
| 2003/0007456 A1* | 1/2003 | Gupta et al. | 370/232 |
| 2003/0165118 A1* | 9/2003 | Ota et al. | 370/252 |
| 2004/0022267 A1* | 2/2004 | Birru | 370/468 |
| 2004/0064351 A1* | 4/2004 | Mikurak | 705/7 |
| 2006/0178918 A1* | 8/2006 | Mikurak | 705/7 |
| 2006/0264177 A1* | 11/2006 | Heidari-Bateni et al. | 455/62 |
| 2008/0259852 A1* | 10/2008 | Massiera et al. | 370/329 |
| 2009/0285201 A1* | 11/2009 | Ben-Haim et al. | 370/352 |

FOREIGN PATENT DOCUMENTS

| | | |
|---|---|---|
| JP | 11-4225 A | 1/1999 |
| JP | 2001-11615 A | 4/2001 |
| JP | 2003-229877 A | 8/2003 |
| JP | 2003-264867 A | 9/2003 |
| JP | 2003-274446 A | 9/2003 |
| JP | 2004-153505 A | 5/2004 |
| WO | WO 2004/006661 A1 | 8/2004 |

* cited by examiner

F I G. 1
(a)
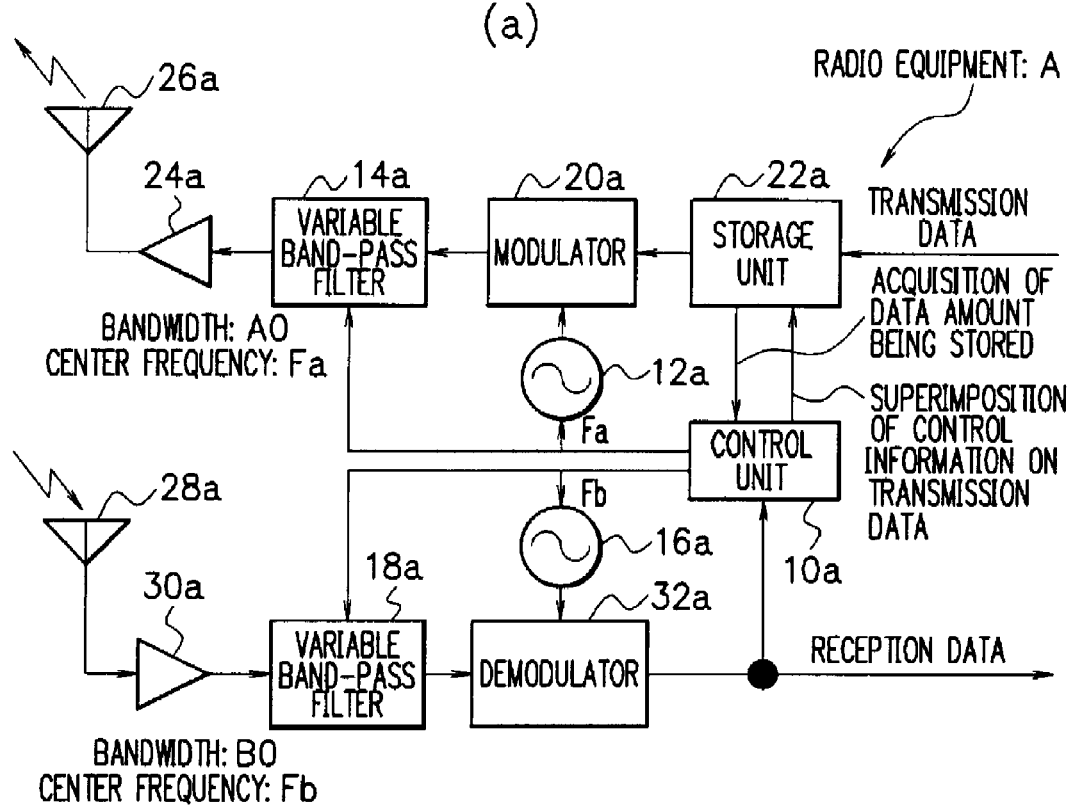
(b)
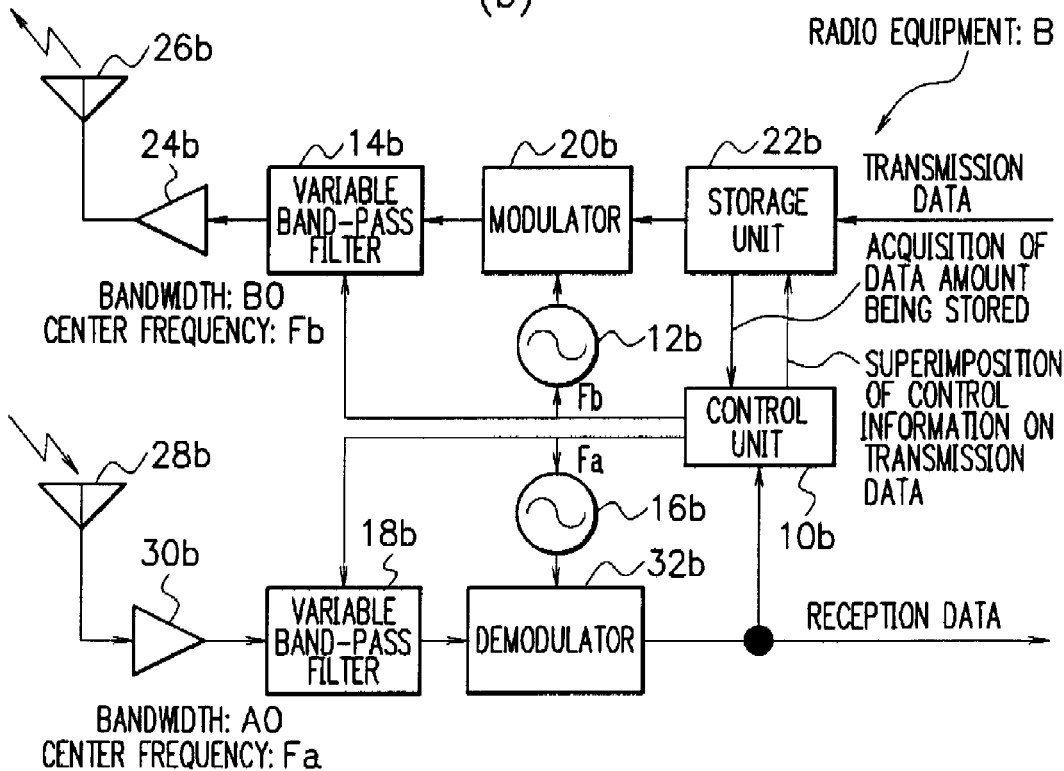

(a)

(b)

(c)

A2 : B2 = A1 : B1

F I G. 6
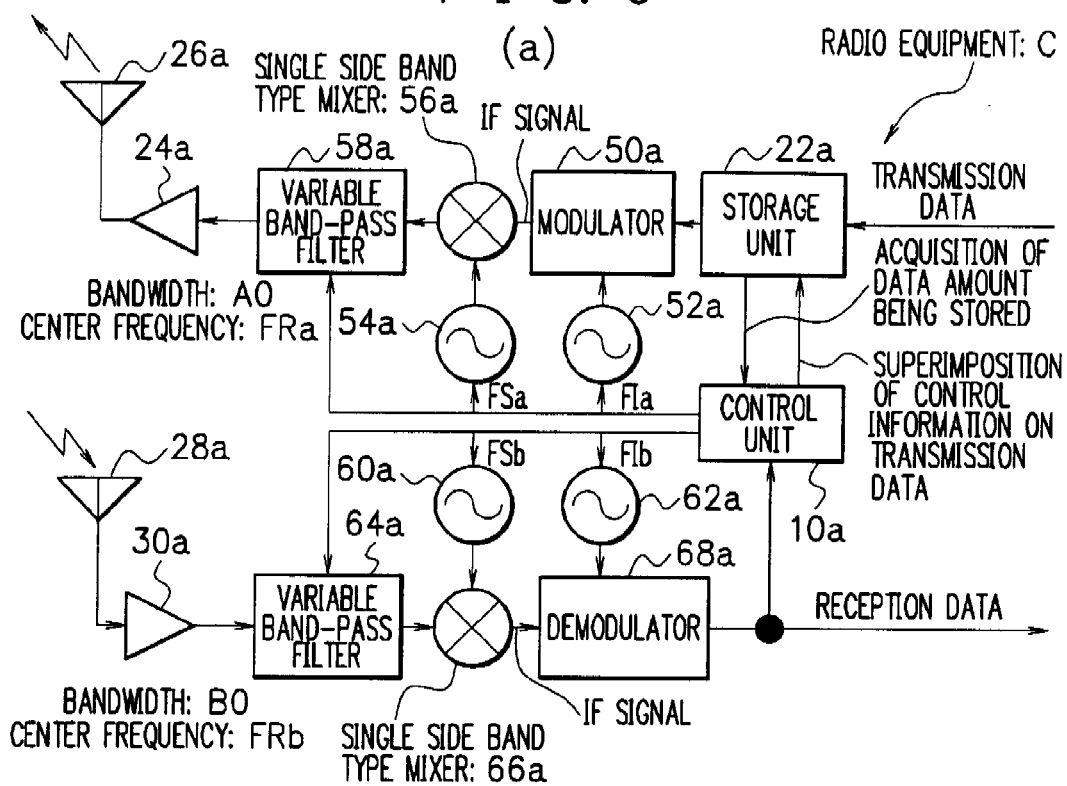
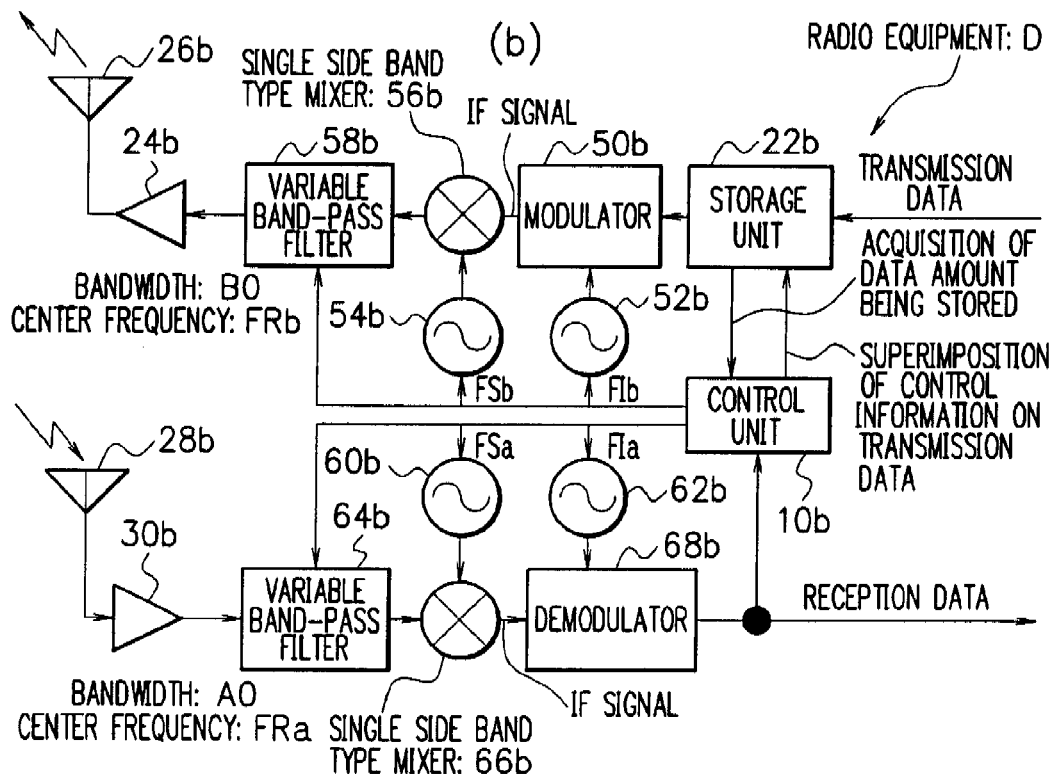

F I G. 7
(a)
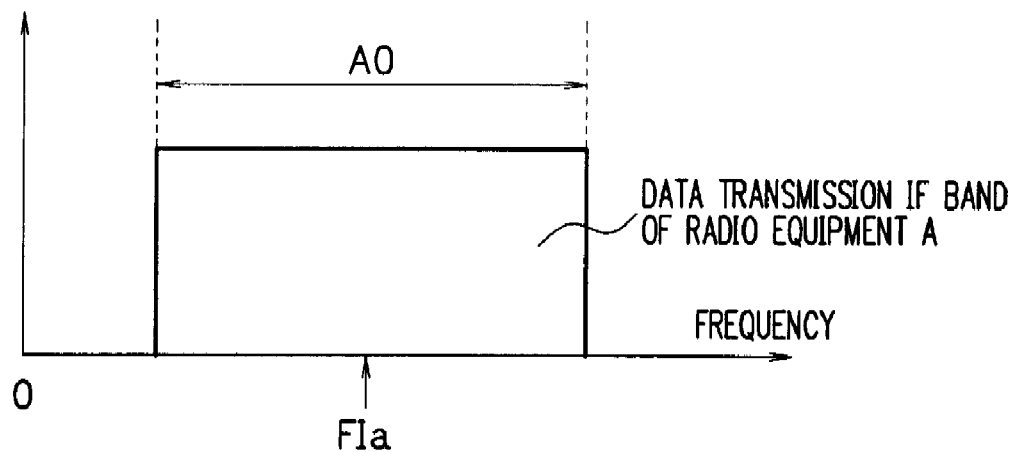
(b)
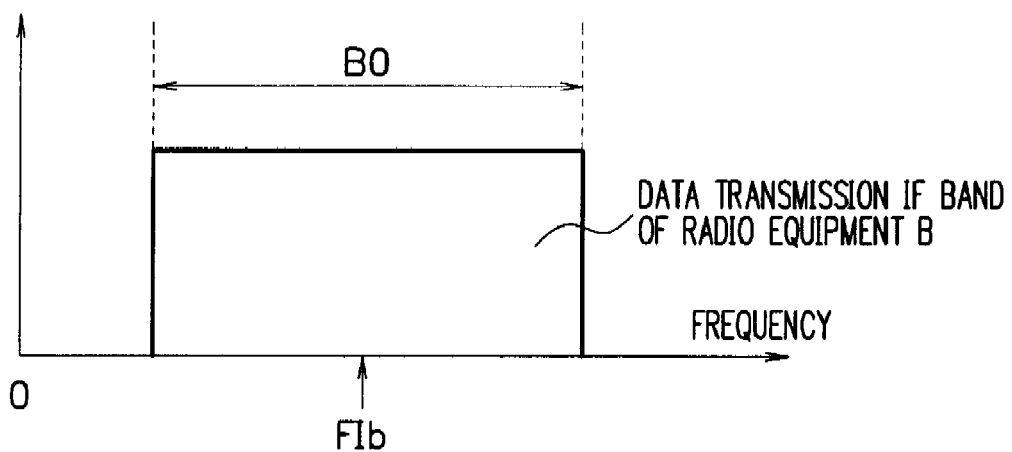

BAND CONTROL METHOD AND COMMUNICATION APPARATUS

TECHNICAL FIELD

The present invention relates to a band control method and a communication apparatus which performs data communication using the band control method, and particularly to a band control method and a communication apparatus which enable utilization of transmission frequency band to the maximum extent used at data transmission between two communication apparatuses communicating based on full duplex communication method.

BACKGROUND ART

As a method for performing transmission and reception of data simultaneously between two communication apparatuses, a full duplex communication method is known. With the full duplex communication method, circuits (transmission circuit and reception circuit) between two communication apparatuses should exist without interfering each other. For this reason, full duplex communication method employs FDD (Frequency Division Duplex) method in which frequency bands used for transmission and reception are made different between two communication apparatuses.

Frequency bands to be used for transmission and reception are normally fixed at the time of designing and guard band is normally provided between two frequency bands so as to prevent interference between transmission frequency band to be used for transmission and reception frequency band to be used for reception In addition, although different from the above-mentioned FDD method, as a communication method for performing simultaneous transmission and reception with simulated manner between two communication apparatuses, TDMA (Time Division Multiple Access) communication method is available.

Meanwhile, Patent Document 1 discloses such a method that in TDMA communication between a base station and a subscriber station (mobile station), the number of time slots of an uplink and a downlink is changed depending on an amount of data transmitted from the base station to the subscriber station and an amount of data transmitted from subscriber station to the base station.

With TDMA communication method using the same frequency, it is not possible to transmit a data simultaneously in both directions, and therefore, time for data transmission (time slot) should be made different by each of the stations. Namely, since direction of communication is shifted utilizing time slot as a unit, full duplex communication is not possible with TDMA communication method.

Patent Document Japanese Patent Laid-Open No. 2003-274446

DISCLOSURE OF THE INVENTION

An amount of communication data between two communication apparatuses communicating based on full duplex communication method may change greatly depending on a time. When a first communication apparatus performs an acquisition request to a second communication apparatus for a large quantity of data, for example, the first communication apparatus is enough to send a small quantity of data to the second communication apparatus, while the second communication apparatus should send a large quantities of data to the first communication apparatus according to the acquisition request. Further, in some cases, nearly equivalent amount of data are transmitted for both transmission and reception as is a case of television-phone.

The present invention has been developed in view of the above aspects, and an object of the present invention is to provide a band control method and a communication apparatus which, for communication between two communication apparatuses each engaged in full duplex communication, when one communication apparatus has a surplus band in the transmission band, while transmission band of other communication apparatus is insufficient, enables improvement of communication efficiency by using a surplus band of the one to transmission band of the other.

In order to accomplish the aforementioned target, the present invention has the following features:

A band control method according to the present invention controls a frequency band which a first communication apparatus and a second communication apparatus use at the time of data transmission, and the frequency band used by the first communication apparatus at data transmission is different from the frequency band used by said second communication apparatus at data transmission. The band control method includes a bandwidth presumption step for presuming a first bandwidth required for data transmission by the first communication apparatus and a second bandwidth required for data transmission by said second communication apparatus; a bandwidth comparison step for comparing the first bandwidth with a first bandwidth used which said first communication apparatus currently uses, and said second bandwidth with a second bandwidth used which said second communication apparatus currently uses; and bandwidth used determination step for adjusting said first bandwidth and said second bandwidth according to results of the comparison made by the bandwidth comparison step and for determining a third bandwidth used by the first communication apparatus at data transmission and a fourth bandwidth used by said second communication apparatus at data transmission.

In the band control method according to the present invention, the bandwidth presumption step is characterized by that the first communication apparatus presumes said first bandwidth and said second communication apparatus presumes said second bandwidth.

Further, in the band control method according to the present invention, the bandwidth comparison step is characterized by that the first communication apparatus acquires from said second communication apparatus said second bandwidth, and the first communication apparatus compares said first bandwidth with said first bandwidth used and at the same time, compares said second bandwidth with said second bandwidth used.

Further, in the band control method according to the present invention, the bandwidth used determination step is characterized by that the first communication apparatus adjusts said first bandwidth and said second bandwidth according to results of the comparison made by the bandwidth comparison step and determines the third bandwidth and said fourth bandwidth.

Further, in the band control method according to the present invention, the bandwidth used determination step is characterized by that the third bandwidth and said fourth bandwidth are determined so that they may not be overlapped within a predetermined frequency domain.

Further, in the band control method according to the present invention, the bandwidth presumption step is characterized by that the first bandwidth and said second bandwidth are presumed periodically with a predetermined time interval.

Further, in the band control method according to the present invention, the bandwidth presumption step is characterized by that said first bandwidth and said second bandwidth are presumed only when, in at least either of the first communication apparatus and said second communication apparatus, an amount of data scheduled to be transmitted is less than a predetermined threshold level through a predetermined time.

Further, the band control method according to the present invention is characterized by that priority is put to data scheduled to be transmitted in at least either of the first communication apparatus and said second communication apparatus, and the bandwidth presumption step adds virtual data which are not transmitted actually according to the priority, and presumes said first bandwidth and said second bandwidth.

Further, in the band control method according to the present invention, the first communication apparatus and said second communication apparatus are characterized by that carrier frequency is modulated directly by transmission data to allow data transmission.

Further, in the band control method according to the present invention, the first communication apparatus and said second communication apparatus are characterized by that the carrier frequency is single side band amplitude modulated after an intermediate frequency is modulated by the transmission data to allow data transmission.

Further, in the band control method according to the present invention, the first communication apparatus and said second communication apparatus are characterized by that a number of carriers for multicarrier modulation is adjusted utilizing multicarrier modulation, based on said third bandwidth and said fourth bandwidth to allow data transmission.

Further, the band control method according to the present invention is characterized by that when results of the comparison by the bandwidth comparison step reveal that the first bandwidth is smaller than said first bandwidth used or said second bandwidth is smaller than said second bandwidth used, the first bandwidth used is changed to said third bandwidth, and the second bandwidth used is changed to said fourth bandwidth.

Further, in the band control method according to the present invention, the bandwidth used determination step is characterized by that the third bandwidth, center frequency of said third bandwidth, said fourth bandwidth, and center frequency of said fourth bandwidth are determined.

Further, the communication apparatus according to the present invention is a communication apparatus performing data transmission by controlling a frequency band when data transmission is performed with other communication apparatuses, and frequency bands used when the communication apparatus and other communication apparatuses perform data transmission are different frequency bands; said communication apparatus includes a bandwidth presumption means for presuming a first bandwidth required for data transmission by the communication apparatus, a bandwidth acquisition means for acquiring from said other communication apparatuses a second bandwidth required for data transmission by other communication apparatuses, a bandwidth comparison means for comparing a first bandwidth with a first bandwidth used which said first communication apparatus currently uses and at the same time, compares said second bandwidth with a second bandwidth used which said second communication apparatus currently uses, and a bandwidth used determination means for adjusting said first bandwidth and said second bandwidth according to results of the comparison made by the bandwidth comparison means and for determining a third bandwidth to be used by the first communication apparatus at data transmission and a fourth bandwidth to be used by said second communication apparatus at data transmission.

Further, in the communication apparatus according to the present invention, the bandwidth used determination means is characterized by that the third bandwidth, center frequency of said third bandwidth, said fourth bandwidth, center frequency of said fourth bandwidth are determined.

Further, the communication apparatus according to the present invention includes a transmission means for transmitting data to said other communication apparatuses using a third bandwidth and center frequency of said third bandwidth, and a reception means for receiving data from said other communication apparatuses using a fourth bandwidth and center frequency of said fourth bandwidth.

Further, in the communication apparatus according to the present invention, the bandwidth presumption means presumes periodically a first bandwidth with a predetermined time interval.

Further, in the communication apparatus according to the present invention, the bandwidth presumption means presumes said first bandwidth only when, in at least either of the communication apparatus and said other communication apparatus, an amount of data scheduled to be transmitted is less than a predetermined threshold level through a predetermined time.

Further, in the communication apparatus according to the present invention, priority is put to data scheduled to be transmitted in at least either of the communication apparatus and said other communication apparatus, and the bandwidth presumption means adds virtual data which are not transmitted actually according to the priority and presumes said first bandwidth.

Further, the communication apparatus according to the present invention modulates directly a carrier frequency by transmission data to allow data transmission.

Further, the communication apparatus according to the present invention performs single side band amplitude modulation of a carrier frequency after an intermediate frequency is modulated by the transmission data to allow data transmission.

Further, the communication apparatus according to the present invention adjusts a number of carriers for multicarrier modulation utilizing multicarrier modulation, based on said third bandwidth and said fourth bandwidth to allow data transmission.

ADVANTAGES OF THE INVENTION

The present invention presumes a first bandwidth required for data transmission by the first communication apparatus and a second bandwidth required for data transmission by the second communication apparatus. The present invention compares the first bandwidth with a first bandwidth used which the first communication apparatus currently uses and at the same time, compares the second bandwidth with a second bandwidth used which the second communication apparatus currently uses. The present invention then adjusts a first bandwidth and a second bandwidth according to results of the comparison and determines a third bandwidth to be used by the first communication apparatus at data transmission and a fourth bandwidth to be used by the second communication apparatus at data transmission. With these features, for communication between two communication apparatuses each engaged in full duplex communication, when one communication apparatus has a surplus band in the transmission band, while transmission band of other communication apparatus is insufficient, it is possible to use the surplus band of the one to the transmission band of the other, and therefore it is eventually possible to perform data transmission effectively even in a case where amount of communication data between two communication apparatuses change greatly with time.

EXEMPLARY EMBODIMENTS

Referring now to FIG. 1 and FIG. 2, a band control method performed between communication apparatuses in the present embodiment will be explained.

The band control method performed between communication apparatuses in the present embodiment is, as shown in FIG. 1, a band control method which controls a frequency band used by a first communication apparatus (corresponding to radio equipment A) and a second communication apparatus (corresponding to radio equipment B) at data transmission, while frequency bands (A0, B0 shown in FIG. 2) used by the first communication apparatus (A) and the second communication apparatus (B) at data transmission are different frequency bands each other.

First, a first bandwidth required by a first communication apparatus (A) for data transmission and a second bandwidth required by a second communication apparatus (B) for data transmission are presumed. Next, the first bandwidth presumed as mentioned above and a first bandwidth used which the first communication apparatus (A) currently uses are compared and at the same time, the second bandwidth presumed as mentioned above and a second bandwidth used which the second communication apparatus (B) currently uses are compared. The first bandwidth and the second bandwidth are adjusted according to results of the comparison, and a third bandwidth to be used by the first communication apparatus (A) at data transmission and a fourth bandwidth to be used by the second communication apparatus (B) at data transmission are determined. With these features, for communication between two communication apparatuses (A, B) each engaged in full duplex communication, when one communication apparatus has a surplus band in the transmission band, while transmission band of other communication apparatus is insufficient, it is possible to use the surplus band of the one to the transmission band of the other, and therefore it is eventually possible to perform data transmission effectively even in a case where amounts of communication data between two communication apparatuses (A, B) change greatly with time. Referring to attached drawings, the band control method in the present embodiment will be explained hereafter. Further, in the following embodiment, although explanations are given based on a case where radio equipment is applied as the communication apparatus, the band control method according to the present invention is not limited to the radio equipment and is applicable to every communication apparatus including wired equipments designed for communication by full duplex communication method.

First Exemplary Embodiment

First, referring to FIG. 1, compositions of the radio equipment A and radio equipment B in the present embodiment will be explained. FIG. 1(a) shows the composition of the radio equipment A and FIG. 1(b) shows the composition of the radio equipment B.

The radio equipment A in the present embodiment includes, as shown in FIG. 1(a), a control unit 10a, a storage unit 22a, a variable oscillator 12a, a modulator 20a, a variable band-pass filter 14a, a high-frequency amplifier 24a, a transmission antenna 26a, a reception antenna 28a, a high-frequency amplifier 30a, a variable band-pass filter 18a, a demodulator 32a, a variable oscillator 16a.

Further, the radio equipment B in the present embodiment includes, as shown in FIG. 1(b), a control unit 10b, a storage unit 22b, a variable oscillator 12b, a modulator 20b, a variable band-pass filter 14b, a high-frequency amplifier 24b, a transmission antenna 26b, a reception antenna 28b, a high-frequency amplifier 30b, a variable band-pass filter 18b, a demodulator 32b, a variable oscillator 16b.

Further, the radio equipment A in the present embodiment transmits to the radio equipment B transmission data by the control unit 10a, the storage unit 22a, the variable oscillator 12a, the modulator 20a, the variable band-pass filter 14a, the high-frequency amplifier 24a, the transmission antenna 26a.

Further, it receives from the radio equipment B reception data by the control unit 10a, the reception antenna 28a, the high-frequency amplifier 30a, the variable band-pass filter 18a, the demodulator 32a, the variable oscillator 16a.

Further, the radio equipment B in the present embodiment transmits to the radio equipment A a transmission data by the control unit 10b, the storage unit 22b, the variable oscillator 12b, the modulator 20b, the variable band-pass filter 14b, the high-frequency amplifier 24b, the transmission antenna 26b.

Further, it receives from the radio equipment A reception data by the control unit 10b, the reception antenna 28b, the high-frequency amplifier 30b, the variable band-pass filter 18b, the demodulator 32b, the variable oscillator 16b.

Further, the radio equipment A and radio equipment B in the present embodiment will perform full duplex communication (e.g., packet communication) within a bandwidth WL specified by lower limit frequency Fmin and upper limit frequency Fmax regulated by rules and the like as illustrated in FIG. 2. For example, full duplex communication is performed while the lower limit frequency Fmin is set to 59 GHz, the upper limit frequency Fmax to 66 GHz, basic transmission speed to 1.25 GHz.

Further, as shown in FIG. 2, the radio equipment A in the present embodiment transmits to the radio equipment B data (information) using a low-frequency side band A0 (bandwidth is also designated by A0). Meanwhile, the radio equipment B transmits to the radio equipment A data using a high-frequency side band B0 (bandwidth is also designated by B0). In this case, the radio equipment A will receive from the radio equipment B data using the band B. Further, the radio equipment B will receive from the radio equipment A data using the band A0.

In the meantime, it is possible to configure such a construction that data are transmitted while the radio equipment A uses the high-frequency side band B0 and the radio equipment B uses the low-frequency side band A0, and data are received while the radio equipment A uses the band A0 and the radio equipment B uses the band B0.

Further, a guard band is normally provided between the band A0 and the band B0 shown in FIG. 2 in order to avoid possible interference between transmission data and reception data, while explanations will be given without the guard band for the sake of simplicity of explanation and illustration of the present embodiment. Accordingly, in the present embodiment, as shown in FIG. 2, bandwidth WL specified by the lower limit frequency Fmin and the upper limit frequency Fmax is designated as WL=A0+B0, center frequency of the band A0 is designated as Fa, and center frequency of the band B0 is designated as Fb.

Further, in order to facilitate communication, following settings are provided to the control unit 10a of the radio equipment A and to the control unit 10b of the radio equipment B.

The control unit 10a of the radio equipment A sets oscillation frequency of the variable oscillator 12a at transmission side to Fa, sets a pass band of the variable band-pass filter 14a to A0, and sets center frequency to Fa. In addition, it sets oscillation frequency of the variable oscillator 16a at reception side to Fb, sets a pass band of the variable band-pass filter 18a to B0, and sets center frequency to Fb.

In the meantime, the control unit 10b of the radio equipment B sets oscillation frequency of the variable oscillator 12b at transmission side to Fb, sets a pass band of the variable band-pass filter 14b to B0, and sets center frequency to Fb. In addition, it sets oscillation frequency of the variable oscillator 16b at reception side to Fb, sets a pass band of the variable band-pass filter 18b to A0, and sets center frequency to Fa.

Further, in the radio equipment A, the modulator 20a modulates carrier frequency (oscillation frequency Fa of variable oscillator 12a) by transmission data stored (memorized) in the storage unit 22a. Meanwhile, a modulation method in the present embodiment is not particularly limited and every modulation method can be applied. Various modulation methods, for example, ASK (Amplitude Shift Keying), PSK (Phase Shift Keying), QAM (Quadrature Amplitude Modulation), FSK (Frequency Shift Keying) and the like are applicable.

Carrier frequency Fa modulated by the modulator 20a is emitted in the air from the transmission antenna 26a via the variable band-pass filter 14a (bandwidth is set to A0) and the high-frequency amplifier 24a. With this feature, it is now possible for the radio equipment A to transmit to the radio equipment B transmission data.

The radio equipment B supplies a transmission data from the radio equipment A which is received by the reception antenna 28b to the demodulator 32b via the high-frequency amplifier 30b and the variable band-pass filter 18b (bandwidth is set to A0). The demodulator 32b, using oscillation frequency Fa from the variable oscillator 16b, generates reception data by demodulating an original signal sent from the radio equipment A.

In this way, the radio equipment A modulates oscillation frequency Fa set to the variable oscillator 12a by the transmission data stored in the storage unit 22a and transmits it to the radio equipment B via the variable band-pass filter (bandwidth A0, center frequency Fa) 14a. The radio equipment B then outputs reception data received from the radio equipment A to the demodulator 32b via the variable band-pass filter 18b (bandwidth A0, center frequency Fa), modulates it by oscillation frequency Fa being set to the variable oscillator 16b to generate reception data.

For such processing that the radio equipment B transmits the transmission data stored in the storage unit 22b to the radio equipment A, the radio equipment A receives the transmission data from the radio equipment B, and generates reception data, the same processing as mentioned above will be performed.

The radio equipment A and the radio equipment B in the present embodiment determine an optimum frequency band to be used in a subsequent communication period (this will be dealt with later) during communication by the radio equipment A and the radio equipment B as mentioned above, interrupt communication temporarily to allow the radio equipment A and the radio equipment B to communicate with the optimum frequency band thus determined, and change constants of an electronic circuit. Following this, in the subsequent communication period, communication of the radio equipment A and the radio equipment B will be resumed using aforementioned optimum frequency band.

Next, referring to FIG. 3 through FIG. 5, processing to be performed for determination of an optimum frequency band used in the subsequent communication period will be explained.

FIG. 3 is a drawing showing processing for obtaining frequency bands (A1 and B1) to be used in the subsequent communication period periodically (e.g., every 10 msec) in the radio equipment A and the radio equipment B. Optimum frequency bands (A2 and B2) to be used in the subsequent communication period will be determined by performing processing shown in FIG. 4 based on the frequency band (A1 and B1) obtained in FIG. 3.

In a case the optimum frequency band is determined periodically, the "subsequent communication period" mentioned above will be a period obtained by subtracting "period in which communication between the radio equipment A and the radio equipment B is interrupted temporarily" from "time interval (e.g., 10 msec) for periodical determination of an optimum frequency band". However, "period in which communication between the radio equipment A and the radio equipment B is interrupted temporarily" is an extremely short time period. Therefore, in the present embodiment, for the sake of simplicity of explanation, when the optimum frequency band is determined periodically, explanations will be given considering that aforementioned "subsequent communication period" is nearly equal to "time interval (e.g., 10 msec) for periodical determination of an optimum frequency band".

First, as shown in step S10 in FIG. 3, the control unit 10a of the radio equipment A shown in FIG. 1 starts determination of frequency band control according to an amount of data scheduled to be transmitted in the subsequent transmission period (communication period) and at the same time, transmits to the radio equipment B a start signal for starting determination of frequency band control being superimposed on the data transmitted currently. In other words, the control unit 10a calculates bandwidth A1 from the amount of data scheduled to be transmitted in the subsequent transmission period (communication period) stored in the storage unit 22a (step S10).

Meanwhile, the control unit 10b of the radio equipment B responds to the start signal being sent from the radio equipment A and starts determination of frequency band control according to an amount of data scheduled to be transmitted in the subsequent transmission period (communication period). In other words, the control unit 10b calculates bandwidth B1 from the amount of data scheduled to be transmitted in the subsequent transmission period (communication period) stored in the storage unit 22b and transmits calculation results (data showing bandwidth B1) to the radio equipment A being superimposed on the data being transmitted currently (step S12).

Meanwhile, the control unit 10a (and the control unit 10b) will calculate bandwidth A1 according to an amount of data scheduled to be transmitted in the subsequent transmission period (communication period). For example, an amount of data stored in the storage unit 22a is assumed to be 10 Mbit. If the subsequent transmission period (renewal time interval) is 10 msec as mentioned above, transmission speed will be 1000 Mbit/s. If BPSK (Binary Phase Shift Keying) is used as the modulation method, 1 bit/symbol is applied and transmission speed will be 1000 Msymbol/s, and if 1 Hz is necessary per 1 symbol, a required band will be 1000 MHz.

Next, in step S14, the control unit 10a of the radio equipment A takes in calculation results (data showing bandwidth B1) being sent from the radio equipment B.

With this feature, it is now possible for the control unit 10a of the radio equipment A to acquire transmission bandwidth A1 of the radio equipment A and transmission bandwidth B1 of the radio equipment B.

When the radio equipment A and the radio equipment B are independently capable of identifying accurately a start time point of the frequency band control for a case where bandwidth A1 and bandwidth B1 are sought, the radio equipment A needs not to transmit the "start signal for starting determination of frequency band control" to the radio equipment B in step S10 and the radio equipment B needs not to respond to the "start signal" in step 12.

As an instance where the radio equipment A and the radio equipment B are independently capable of identifying accurately a start time point of the frequency band control, such a case is mentioned that control is made so as to start frequency band control every time the control unit 10a of the radio equipment A and the control unit 10b of the radio equipment B make judgment that a predetermined time (e.g., 10 msec) has elapsed.

Although the radio equipment A is to perform frequency band control in the processing shown in FIG. 3, it is also possible to perform this by the radio equipment B.

Although, in the processing shown in FIG. 3, required transmission bandwidth A1 and transmission bandwidth B1 are calculated periodically according to the amount of data scheduled to be transmitted by the radio equipment A and the radio equipment B, when the amount of data scheduled to be transmitted in a plurality of continuous communication periods (required transmission bandwidth) is not changed from a desired value being set at the previous time or variation width is small even if changed, it is possible to configure in such that periodical frequency band control is not performed.

For example, the radio equipment A and the radio equipment B may periodically confirm the amount of data scheduled to be transmitted by themselves, make judgment that current frequency bandwidth has a margin (surplus) only when the amount of data scheduled to be transmitted thus confirmed is continuously less than a predetermined threshold level for a predetermined time, and then frequency band control may be performed. In this case, when the radio equipment A makes judgment that the amount of data scheduled to be transmitted by itself is continuously less than a predetermined threshold level through a predetermined time, a start signal will be transmitted to the radio equipment B as shown in step S10 in FIG. 3. Meanwhile, when the radio equipment B makes judgment that the amount of data scheduled to be transmitted by itself is continuously less than a predetermined threshold level through a predetermined time, bandwidth B1 is calculated and transmitted to the radio equipment A as shown in step S12 in FIG. 3. Responding to this operation, the radio equipment A calculates bandwidth A1 based on the amount of data scheduled to be transmitted by itself.

Alternatively, it is possible to configure in such that priority is put to each of data packets scheduled to be transmitted and then bandwidth A1 and/or bandwidth B1 are calculated. For example, packet data with zero priority are left with the amount of data scheduled to be transmitted actually, while more vacant data (data not transmitted actually) are assigned to packets with higher priority. With this consideration, when there are many data with higher priority, amounts of whole data scheduled to be transmitted will increase naturally, and it is possible to enlarge bandwidth A1 (B1). Meanwhile, number of priorities other than zero priority may be singular or plural. Further, a vacant data is added for calculation of bandwidth A1 (B1) only and is deleted (ignored) at actual transmission.

The control unit 10a of the radio equipment A performs processing shown in FIG. 4 after completed processing shown in FIG. 3.

First, in step S16 in FIG. 4, the control unit 10a of the radio equipment A compares bandwidth A1 calculated in step S10 in FIG. 3 with bandwidth A0 which the radio equipment A currently uses and at the same time, compares bandwidth B1 of the radio equipment B acquired in step S14 in FIG. 3 with bandwidth B0 which the radio equipment B currently uses. The following four types of comparison results will be obtained according to these comparisons:

First comparison result: A1<A0 and B1>B0
Second comparison result: A1>A0 and B1<B0
Third comparison result: A1>A0 and B1>B0
Fourth comparison result: A1≦A0 and B1≦B0

Next, first processing through fourth processing which are based on four types of comparison results obtained in step S16 will be explained.

(First Processing)

First processing is for a case of the first comparison result (A1<A0 and B1>B0) as shown in step S18 in FIG. 4 and in FIG. 5(a).

In the case of first comparison result, good efficiency is not expected with current transmission bandwidth A0 of the radio equipment A and therefore, a marginal (surplus) band (A0-A1) is used as the transmission band of the radio equipment B. Accordingly, bandwidth A2 which the radio equipment A uses and bandwidth B2 which the radio equipment B uses in the subsequent communication period are determined by the following Equation (1).

$$A2 = A1$$

$$B2 = B0 + (A0 - A1) \qquad \text{Equation (1)}$$

(Second Processing)

A second processing is for a case of the second comparison result (A1>A0 and B1<B0) as shown in step S20 in FIG. 4 and FIG. 5(b).

In the case of the second comparison result, contrary to the first processing as mentioned above, efficiency is not good as long as the radio equipment B has current transmission bandwidth B0 and therefore, marginal band (B0-B1) is used as the transmission band of the radio equipment A. Accordingly, bandwidth A2 which the radio equipment A uses and bandwidth B2 which the radio equipment B uses in the subsequent communication period are determined by the following Equation (2).

$$A2 = A1 + (B0 - B1)$$

$$B2 = B1 \qquad \text{Equation (2)}$$

(Third Processing)

A third processing is for a case of the third comparison result (A1>A0 and B1>B0) as shown in step S22 in FIG. 4 and FIG. 5(c).

In the case of the third comparison result, it is configured so that a ratio of the band A2 to the band B2 of the radio equipment A and the radio equipment B used in the subsequent communication period may be equal to a ratio of A1 to B1 of calculation results. Therefore, bandwidth A2 which the radio equipment A uses and bandwidth B2 which the radio equipment B uses in the subsequent communication period are determined by the following Equation (3).

$$A2 = RA \times WL \text{(where, } RA = A1/(A1+B1))$$

$$B2 = RB \times WL \text{(where, } RB = B1/(A1+B1))$$

$$\text{(However, } WL = A2 + B2) \qquad \text{Equation (3)}$$

(Fourth Processing)

A fourth processing is for a case of the fourth comparison result (A1≦A0 and B1≦B0) as shown in step S24 in FIG. 4

In the case of the fourth comparison result, it is not necessary to change current transmission bandwidth of the radio equipment A and the radio equipment B. Therefore, bandwidth A2 which the radio equipment A uses and bandwidth B2 which the radio equipment B uses in the subsequent communication period are determined by the following Equation (4).

$$A2=A0$$

$$B2=B0 \quad \text{Equation (4)}$$

After the first through third processing, center frequency FA of bandwidth A2 and center frequency FB of bandwidth B2 are calculated (step S26), and the radio equipment A transmits to the radio equipment B new band information A2, B2, FA, FB being superimposed on the data being transmitted currently.

Next, the radio equipment A and the radio equipment B set oscillation frequency of the variable oscillators 12a, 12b, 16a, 16b based on aforementioned band information A2, B2, FA, FB within the control time prior to starting of subsequent data transmission period and at the same time, set pass bands of the variable band-pass filters 14a, 14b, 18a, 18b and center frequencies thereof.

In the meantime, time from starting till completion of aforementioned frequency band control is, for example, approximately 10 nsec.

In this way, the radio equipment A presumes a first bandwidth A1 required at data transmission based on the amount of data scheduled to be transmitted. Further, the radio equipment B presumes, in similar fashion as the radio equipment A does, a second bandwidth B1 required at data transmission based on amounts of data scheduled to be transmitted. Next, the radio equipment A acquires from the radio equipment B information about a second bandwidth B1, compares the first bandwidth A1 with a first band width used A0 which the radio equipment A currently uses, and at the same time, compares the second bandwidth B1 with a second band width used B0 which the radio equipment B currently uses. It then adjusts the first bandwidth A1 and the second bandwidth B1 as shown in FIG. 5 according to comparison results, and determines a band information A2, B2, FA, FB; namely, a third bandwidth A2 which the radio equipment A uses at data transmission and center frequency FA of a third bandwidth thereof, a fourth bandwidth B2 which the radio equipment B uses at data transmission and center frequency FB of a fourth bandwidth thereof. Then, band information A2, B2, FA, FB thus determined are set in the radio equipment A and the radio equipment B. With these features, for communication between two radio equipment A and B each engaged in full duplex communication, when one radio equipment has a surplus band in the transmission band, while the transmission band of other radio equipment is insufficient, it is possible to use the surplus band of the one to transmission band of the other, and therefore it is eventually possible to perform data transmission effectively even in a case where amount of communication data between two radio equipment A and B change greatly with time.

Second Exemplary Embodiment

Next, a second exemplary embodiment will be explained.

A radio equipment of the second embodiment converts a transmission signal to IF (Intermediate Frequency) signal, then performs single side band amplitude modulation, transmits the data by passing through a variable band-pass filter, while passing a reception signal through the variable band-pass filter and then changing it to an IF signal to allow modulation. Referring to FIG. 6 and FIG. 7, the radio equipment of the second embodiment will be explained. For frequency band control in the radio equipment of the second embodiment, same controls as observed for the radio equipment of the first embodiment will be performed, while alteration of constants of circuit elements or the like are different. So, the explanation given hereafter will deal primarily with this aspect.

First, referring to FIG. 6, the radio equipment of the second embodiment will be explained. FIG. 6(a) is a schematic diagram showing a composition of a radio equipment C and FIG. 6(b) shows the same of a radio equipment D.

The radio equipment C in the second embodiment includes, as shown in FIG. 6(a), a control unit 10a, a storage unit 22a, a variable oscillator 52a, an IF modulator 50a, a variable oscillator 54a, a single side band type mixer 56a, a variable band-pass filter 58a, a high-frequency amplifier 24a, a transmission antenna 26a, a reception antenna 28a, a high-frequency amplifier 30a, a variable band-pass filter 64a, a variable oscillator 60a, a single side band type mixer 66a, an IF modulator 68a, a variable oscillator 62a.

Further, the radio equipment D in the second embodiment includes, as shown in FIG. 6(b), a control unit 10b, a storage unit 22b, a variable oscillator 52b, an IF modulator 50b, a variable oscillator 54b, a single side band type mixer 56b, a variable band-pass filter 58b, a high-frequency amplifier 24b, a transmission antenna 26b, a reception antenna 28b, a high-frequency amplifier 30b, a variable band-pass filter 64b, a variable oscillator 60b, a single side band type mixer 66b, an IF modulator 68b, a variable oscillator 62b.

The radio equipment C and the radio equipment D are composed with functions similar to the composition of the radio equipment A and the radio equipment B in the first embodiment and therefore, like reference numbers are put to those in FIG. 6 which are identical with circuit parts (unit) of FIG. 1 and explanation thereof will be omitted.

First, communication to be performed prior to frequency band control will be explained. In the second embodiment, the radio equipment C performs communication in bandwidth A0 and the radio equipment D performs communication in bandwidth B0 with a similar manner as the first embodiment.

The IF modulator 50a modulates oscillation frequency FIa from the variable oscillator 52a by data stored in the storage unit 22a and outputs an IF signal (bandwidth A0, center frequency FIa) (see FIG. 7(a)). This IF signal is modulated by carrier frequency FSa in the single side band type mixer 56a which is connected to the variable oscillator 54a, and an only side band at one side is output to the variable band-pass filter 58a (bandwidth A0). If center frequency of the variable band-pass filter 58a is represented by FRa, the following Equation (5) is established.

$$FIa=|FRa-FSa|$$

$$\text{Namely, } FRa=FSa \pm FIa \quad \text{Equation (5)}$$

Further, the IF modulator 50b modulates oscillation frequency FIb from the variable oscillator 52b by data stored in the storage unit 22b and outputs an IF signal (bandwidth B0, center frequency FIb) (see FIG. 7(b)). This IF signal is modulated by carrier frequency FSb in the single side band type mixer 56b which is connected to the variable oscillator 54b, and an only side band at one side is output to the variable band-pass filter 58a (bandwidth B0). If center frequency of the variable band-pass filter 58b is represented by FRb, the following Equation (6) is established.

$$FIb = |FRb - FSb|$$

Namely, $FRb = FSb \pm FIb$            Equation (6)

Therefore, if lower limit frequency and upper limit frequency being set (regulated) are represented by lower limit frequency Fmin and upper limit frequency Fmax, respectively, the radio equipment C and the radio equipment D of the second embodiment will set oscillation frequencies FIa and FIb, and center frequencies FRa and FRb so that bandwidth A0 and bandwidth B0 currently used may be accommodated without overlapping between Fmin and Fmax by the control unit 10a, in similar fashion as observed in the first embodiment.

Accordingly, oscillation frequency of the variable oscillator 60a at reception side of the radio equipment C becomes FSb and oscillation frequency of the variable oscillator 62a becomes FIb. Further, bandwidth of the variable band-pass filter 64a becomes B0 and center frequency becomes FRb.

A signal received by the reception antenna 28a is amplified by the high-frequency amplifier 30a, converted to the IF signal in the single side band type mixer 66a via the variable band-pass filter 64a, and reception data are output from the IF modulator 68a.

Except for oscillation frequency or the like being set, the reception side of the radio equipment D is same as the reception side of the radio equipment C mentioned previously. In other words, oscillation frequency of the variable oscillator 60b becomes FSa and oscillation frequency of the variable oscillator 62b becomes FIa. Further, bandwidth of the variable band-pass filter 64b becomes A0 and center frequency becomes FRa.

A signal received by the reception antenna 28b is amplified by the high-frequency amplifier 30b, converted to the IF signal in the single side band type mixer 66b via the variable band-pass filter 64b, and reception data are output from the IF modulator 68a.

The radio equipment C and the radio equipment D in the second embodiment determine, in similar fashion as the first embodiment, an optimum frequency band to be used in the subsequent communication period during communication between the radio equipment C and the radio equipment D, interrupts communication temporarily so that the radio equipment C and the radio equipment D could communicate in this optimum frequency band, and change constants of an electronic circuit. Following this, communication between the radio equipment C and the radio equipment D is resumed in the subsequent communication period.

That frequency band A1 and B1 are obtained from amounts of data scheduled to be transmitted respectively by the radio equipment C and the radio equipment D, A0 and A1 are compared and at the same time B0 and B1 are compared to determine optimum frequency bands A2 and B2 means that same processing of the first embodiment are performed. In the second embodiment, oscillation frequencies of the variable oscillators 52a, 54a, 52b and 54b at the transmission side are determined and at the same time, center frequencies of the variable band-pass filters 58a and 58b at the transmission side are determined so that optimum frequency bands A2 and B2 thus obtained might not be overlapped between the lower limit frequency Fmin and the upper limit frequency Fmax. After that, settings of a circuit unit at the transmission side and the reception side of the radio equipment C and the radio equipment D will be performed prior to communication resumption.

In this way, the radio equipment of the second embodiment perform single side band amplitude modulation of the carrier frequency after the intermediate frequency is modulated by the transmission data, and similar frequency band controls same as the first embodiment are performed in the radio equipment C and the radio equipment D engaged in data communication. In this configuration, for communication between two radio equipment C and D each engaged in full duplex communication, when one radio equipment has a surplus band in the transmission band, while the transmission band of other radio equipment is insufficient, it is possible to use a surplus band of the one to the transmission band of the other, and therefore it is eventually possible to perform data transmission effectively even in a case where amounts of communication data between two radio equipment C and D change greatly with time.

In the radio equipment of the second embodiment mentioned above, in addition to periodical calculation of transmission band width A1 and B1 required according to the amount of data scheduled to be transmitted by both radio equipment C and D, when the amount of data transmission in a plurality of continuous communication periods (required bandwidth) is not changed from a desired value being set at previous time or variation width is small even if changed, it is possible to configure in such that periodical frequency band control is not performed, as described in the first embodiment.

Third Exemplary Embodiment

Next, the third exemplary embodiment will be explained.

The variable band-pass filters 14a, 14b, 18a, 18b shown in FIG. 1 which illustrates the composition of the radio equipment in the first embodiment, and the variable band-pass filters 58a, 58b, 64a, 64b shown in FIG. 6 which illustrates the composition of the radio equipment in the second embodiment are characterized by that a plurality of fixed band-pass filters 70a through 70n are connected in parallel, a specific fixed band-pass filter is selected from a plurality of fixed band-pass filters 70a through 70n based on a control signal from the control unit 10a or the like, and full duplex communication is performed using the fixed band-pass filter thus selected. With these features, it is possible to perform aforementioned frequency band control using a plurality of fixed band-pass filters without using any variable band-pass filter, thereby allowing cost reduction of the radio equipment. Further, by using a plurality of fixed band-pass filters, a specific fixed band-pass filter can be selected, and full duplex communication is made possible using the fixed band-pass filters thus selected, thereby allowing improvement of communication quality.

When a specific fixed band-pass filter is to be selected, a control signal for selection of a specific fixed band-pass filter is output to a selector 71 from the control unit 10a or the like, and the selector 71 shifts a switch 72 based on the control signal thereof so as to use a specific fixed band-pass filter from a plurality of fixed band-pass filters 70a through 70n being connected in parallel. The composition shown in FIG. 8 is just one example, and every composition can be applied as long as a specific fixed band-pass filter is selected from a plurality of fixed band-pass filters 70a through 70n and full duplex communication can be performed using the fixed band-pass filter thus selected.

Fourth Exemplary Embodiment

Next, the fourth exemplary embodiment will be explained.

The variable oscillators 12a, 12b, 16a, 16b shown in FIG. 1 which illustrates the composition of the radio equipment in the first embodiment, and the variable oscillators 52a, 52b, 54a, 54b, 62a, 62b, 60a, 60b shown in FIG. 6 which illustrates the composition of the radio equipment in the second embodiment are characterized by that, as shown in FIG. 9, a plurality of fixed oscillators 74a through 74n are connected in parallel, a specific fixed oscillator is selected from a plurality of fixed oscillators 74a through 74n based on a control signal from the control unit 10a or the like, and full duplex communication is performed using the fixed oscillator thus selected. With these features, it is possible to perform aforementioned frequency band control using a plurality of fixed oscillators without using any variable oscillator, thereby allowing cost reduction of the radio equipment. Further, by using a plurality of fixed oscillators, a specific fixed oscillator can be selected, and full duplex communication is made possible using the fixed oscillators thus selected, thereby allowing improvement of communication quality.

When a specific oscillator is to be selected, a control signal for selection of a specific fixed oscillator is output to the selector 71 from the control unit 10a or the like, and the selector 71 shifts the switch 72 based on the control signal so as to use a specific fixed oscillator from a plurality of fixed oscillators 74a through 74n being connected in parallel. The composition shown in FIG. 9 is just one example, and every composition can be applied as long as a specific fixed oscillator is selected from a plurality of fixed oscillators 74a through 74n and full duplex communication can be performed using the fixed oscillator thus selected.

Fifth Exemplary Embodiment

Next, the fifth exemplary embodiment will be explained.

The radio equipment in the fifth embodiment performs frequency band control using multicarrier modulation in similar fashion as aforementioned first embodiment, determines an optimum frequency band to be used in the subsequent period, and adjusts the number of carriers for multicarrier modulation based on the optimum frequency band thus determined to allow data transmission. With these features, even with radio equipments employing the multicarrier modulation method, for communication between two radio equipment each engaged in full duplex communication, when one radio equipment has a surplus band in the transmission band, while the transmission band of other radio equipment is insufficient, it is possible to use the surplus band of the one to the transmission band of the other, and therefore it is eventually possible to perform data transmission effectively even in a case where amounts of communication data between two radio equipment change greatly with time. Referring to FIG. 10, details of the radio equipment of the fifth embodiment will be explained hereafter.

As shown in FIG. 10, the radio equipment of the fifth embodiment splits serial data to be transmitted into a plurality of substreams by the serial/parallel converter 80a, modulates each different carrier in the corresponding modulators 82a through 82n according to these substream data, synthesize again substreams after modulation in the synthesizing apparatus 86a, and transmits the synthesized data thus synthesized. If N represents total number of channels and W represents total frequency bandwidth to be used, bandwidth of individual substream is represented by W/N. Since with multicarrier modulation, bit rate of substreams could be made lower, it can be made strong against fading.

The radio equipment of the fifth embodiment shown in FIG. 10 uses like reference numbers (symbols) in the circuit unit corresponding to the circuit unit shown for the radio equipment C of the second embodiment shown in FIG. 6(a).

First, communication performed prior to frequency band control will be explained. The radio equipment of the fifth embodiment transmits data in bandwidth A0 in similar fashion as the first embodiment and at the same time receives a data using bandwidth B0 from the radio equipment (not shown).

First, serial data from the storage unit 22a where transmission data are stored are split into a plurality of substreams in the serial/parallel converter 80a, IF modulated using whole or a part of converters 82a through 82n according to control information from the control unit 10a, and are sent to the synthesizing apparatus 86a via corresponding filters (whole or a part of 84a through 84n). The synthesizing apparatus 86a makes judgment which substream would output the data by control information from the control unit 10a, synthesizes the data, and outputs the IF signal.

IF signal is modulated, in the single side band type mixer 56a which is connected to the variable oscillator 54a, by oscillation frequency (carrier frequency) of the variable oscillator 54a, and the only side band at one side is output to the variable band-pass filter (pass bandwidth A0, center frequency FRa). Pass bandwidth A0 and center frequency FRa in the variable band-pass filters 58a are set by the control unit 10a.

The output data from the variable band-pass filters 58a is emitted from the transmission antenna 26a via the high-frequency amplifier 24a.

Meanwhile, the data from the radio equipment (not shown) are output to the variable band-pass filter 64a (pass bandwidth B0, center frequency FRb) via the reception antenna 28a and the high-frequency amplifier 30a. Pass bandwidth B0 and center frequency FRb in the variable band-pass filter 64a are set by the control unit 10a.

The output data from the variable band-pass filter 64a are output to the single side band type mixer 66a which is connected to the variable oscillator 60a, converted to the IF signal and output to the distributor 100a. Since control information showing which channel should be used is added from the control unit 10a to this distributor 100a, the channel to which the output data are distributed is already identified. Therefore, the distributor 100a distributes data to the corresponding modulators (whole or a part of 104a through 104n) via whole or a part of a plurality of filters 102a through 102n. Data from the modulators 104a through 104n are converted to serial data by the parallel/serial converter 106a (from which channel are the data output is indicated by the control unit 10a) to obtain reception data.

In this way, the radio equipment of the fifth embodiment determines the optimum frequency band to be used in the subsequent communication period during communication between the radio equipment shown in FIG. 10 and the radio equipment (not shown) with a similar manner as observed in the first and the second embodiments, interrupts communication temporarily so that both radio equipment could communicate in this optimum frequency band, and change constants of an electronic circuit. Following this, communication between the radio equipment shown in FIG. 10 and the radio equipment (not shown) is resumed in the subsequent communication period.

Namely, the radio equipment shown in FIG. 10 and the radio equipment (not shown) obtain frequency band A1 and B1 respectively from amounts of data scheduled to be transmitted, compare A0 with A1 and at the same compare B0 with B1 to determine the optimum frequency band A2 and B2.

In the fifth embodiment, the control unit 10a selects a channel to be used based on the optimum frequency bands A2 and B2 so that the channel may be accommodated without overlapping between the lower limit frequency Fmin and the upper limit frequency Fmax (namely, selects a carrier among a plurality of carriers with which modulation or demodulation should be made), and transmits control information thereof to the radio equipment (not shown). After that, prior to the resume in communication, the control unit 10a transmits a control signal to the serial/parallel converter 80a, the synthesizing apparatus 86a, the distributor 100a, the parallel/serial converter 106a to perform settings of circuit constants. In the meantime, settings of circuit constants are performed also in the radio equipment (not shown) with a similar manner as observed for the radio equipment shown in FIG. 10.

Also in the radio equipment of the fifth embodiment mentioned above, in addition to periodical calculation of transmission band width A1 and B1 required according to the amount of data scheduled to be transmitted by both radio equipment, when the amount of data transmission in a plurality of continuous communication periods (required bandwidth) is not changed from a desired value being set previous time or variation width is small even if changed, it is possible to configure in such that periodical frequency band control is not performed, as described in the first embodiment.

In addition to the method in which the individual substream is subject to modulation and demodulation, it is possible to apply OFDM (Orthogonal Frequency Division Multiplexing) that is capable of performing multicarrier modulation and demodulation collectively.

The aforementioned embodiments are preferable embodiments of the present invention and the scope of the present invention is not limited thereto, and various modifications can be made to the embodiments without departing the spirit and scope of the present invention.

BRIEF DESCRIPTION OF THE DRAWINGS

FIG. 1 is a drawing for explaining the composition of the radio equipment in the first embodiment;

FIG. 6 is a drawing for explaining the composition of the radio equipment in the second embodiment;

FIG. 7 is a drawing for explaining the second embodiment;

EXPLANATION OF REFERENCE NUMERALS

Figure 2:
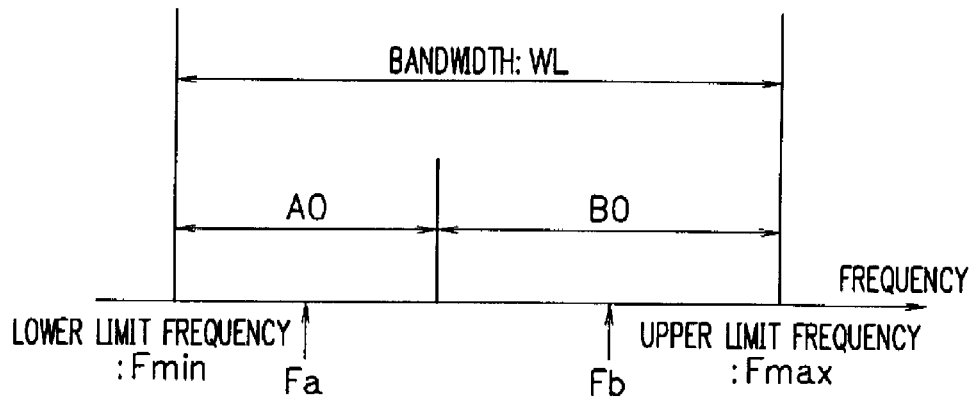
FIG. 2 is a drawing for explaining the first embodiment.
Figure 3:
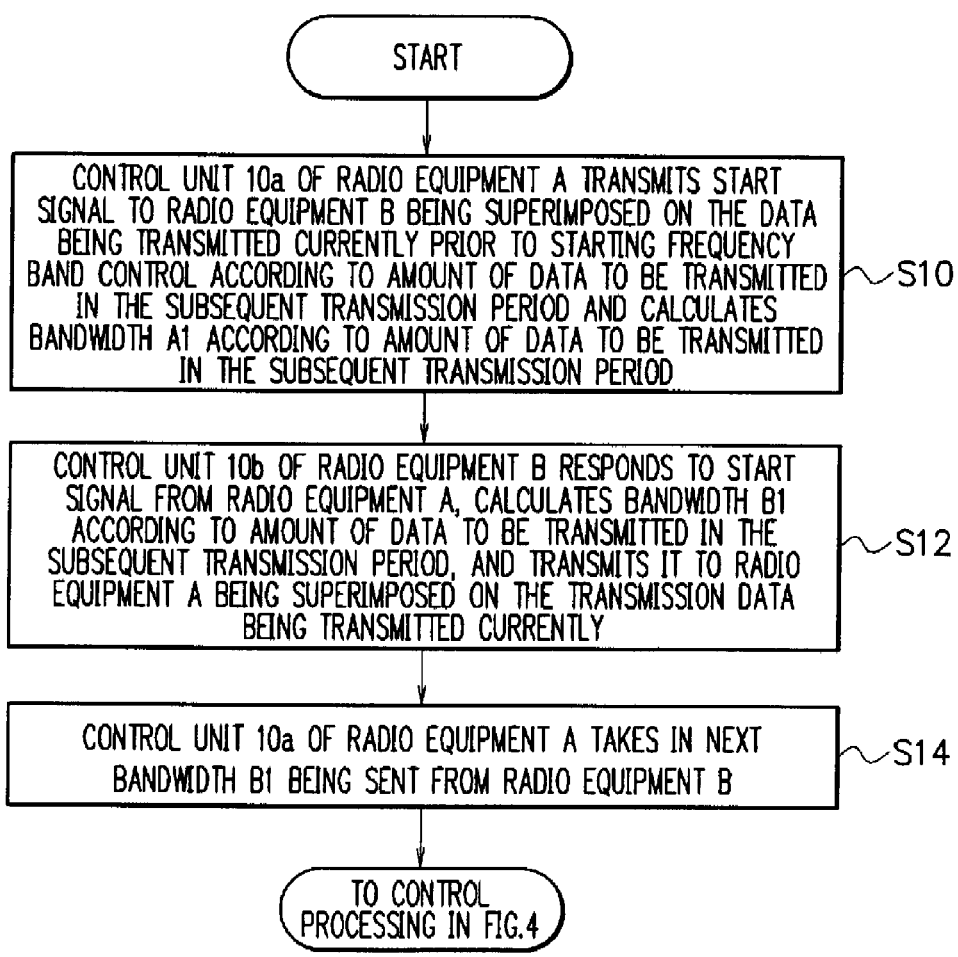
FIG. 3 is a first flowchart for explaining control operations of the radio equipment in the first embodiment.
Figure 4:
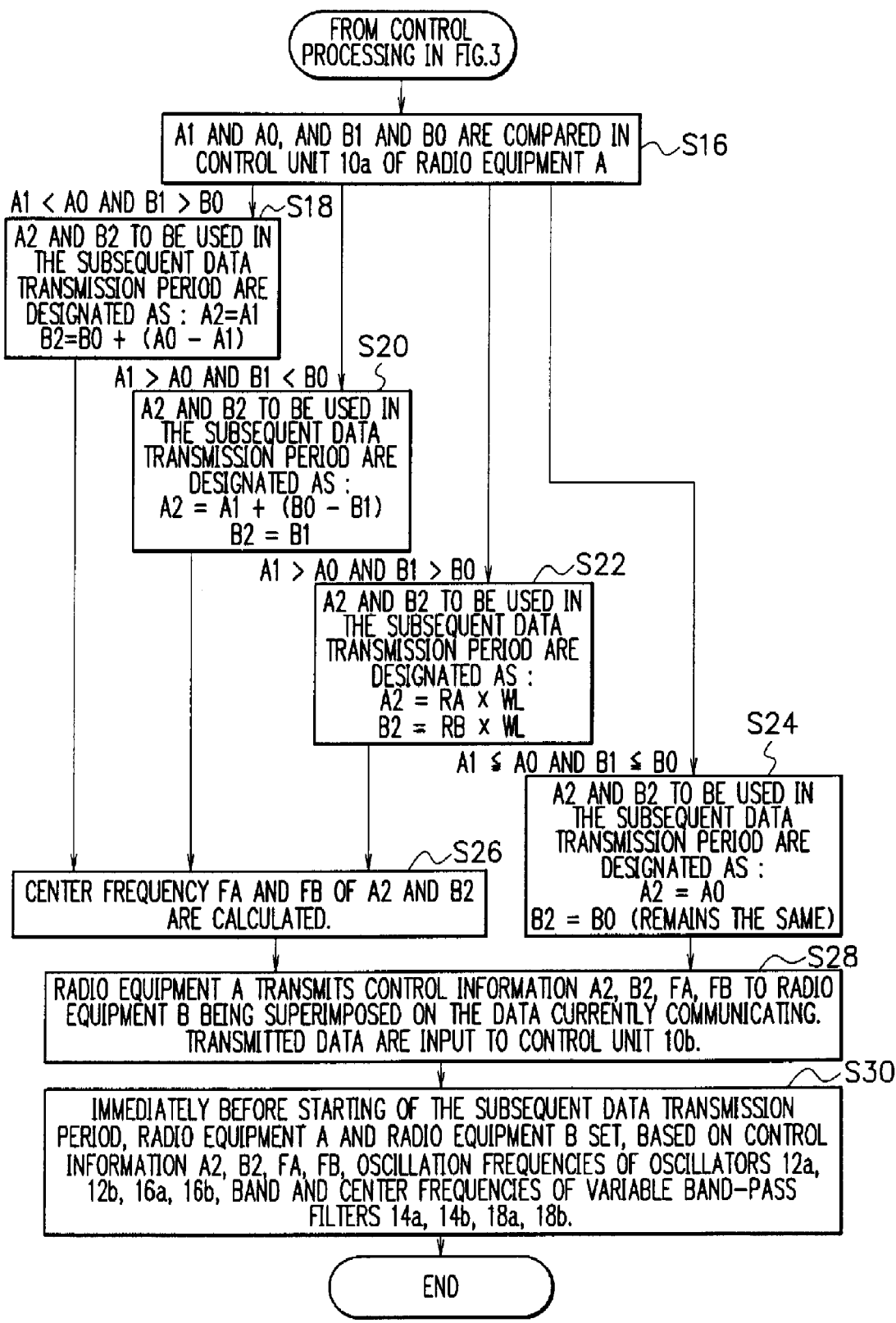
FIG. 4 is a second flowchart for explaining control operations of the radio equipment in the first embodiment.
Figure 5:
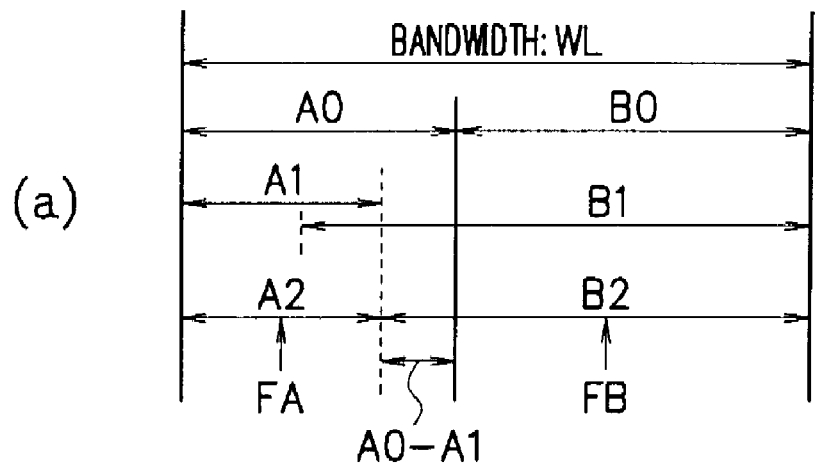
FIG. 5 is a drawing for explaining the first embodiment.
Figure 5:
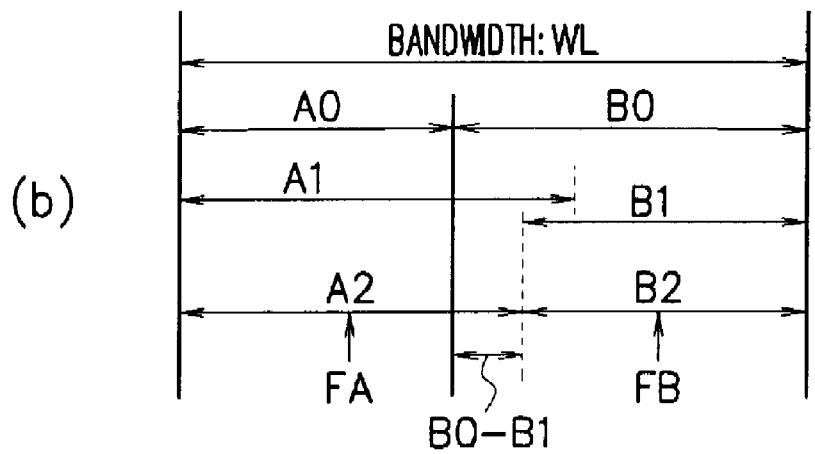
Figure 5:
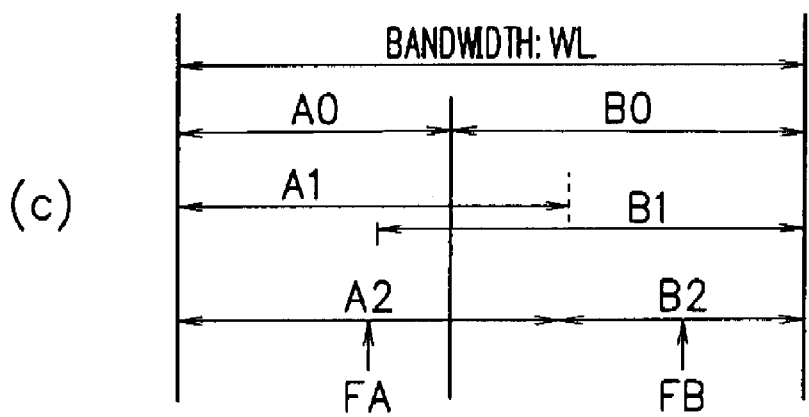
Figure 8:
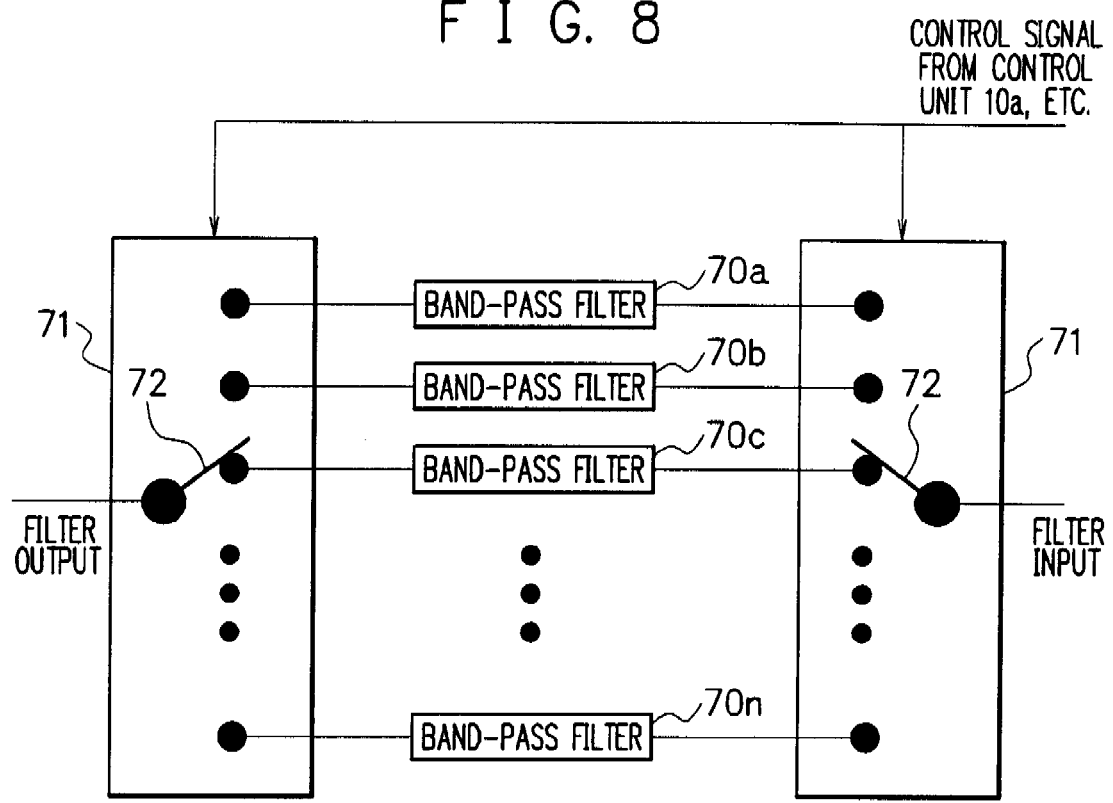
FIG. 8 is a drawing for explaining the composition of the radio equipment in the third embodiment and illustrates a variation of variable filters to be used in the radio equipment in the first and the second embodiments.
Figure 9:
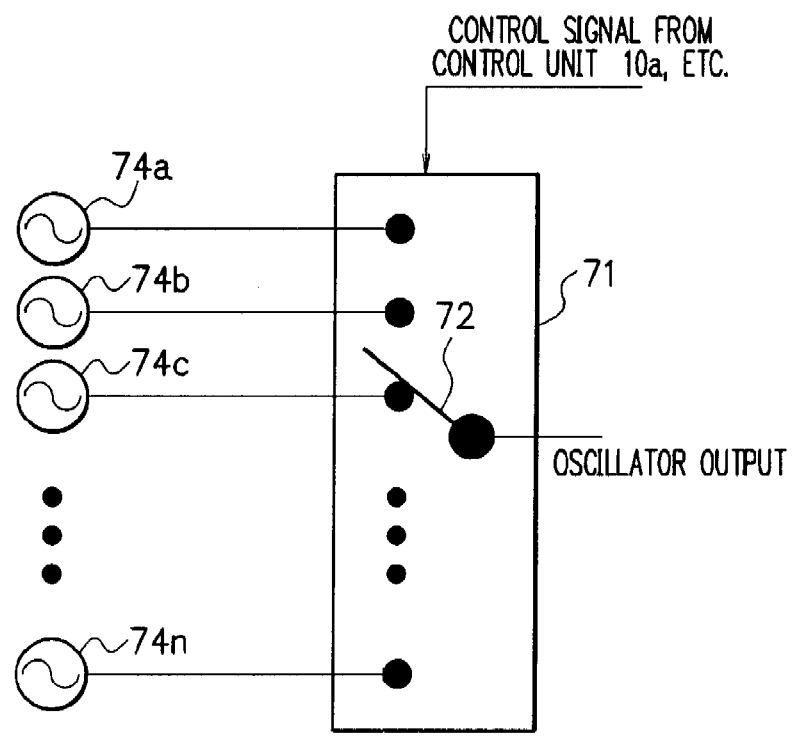
FIG. 9 is a drawing for explaining the composition of the radio equipment in the fourth embodiment and illustrates a variation of a variable oscillator to be used in the first and the second embodiments.
Figure 10:
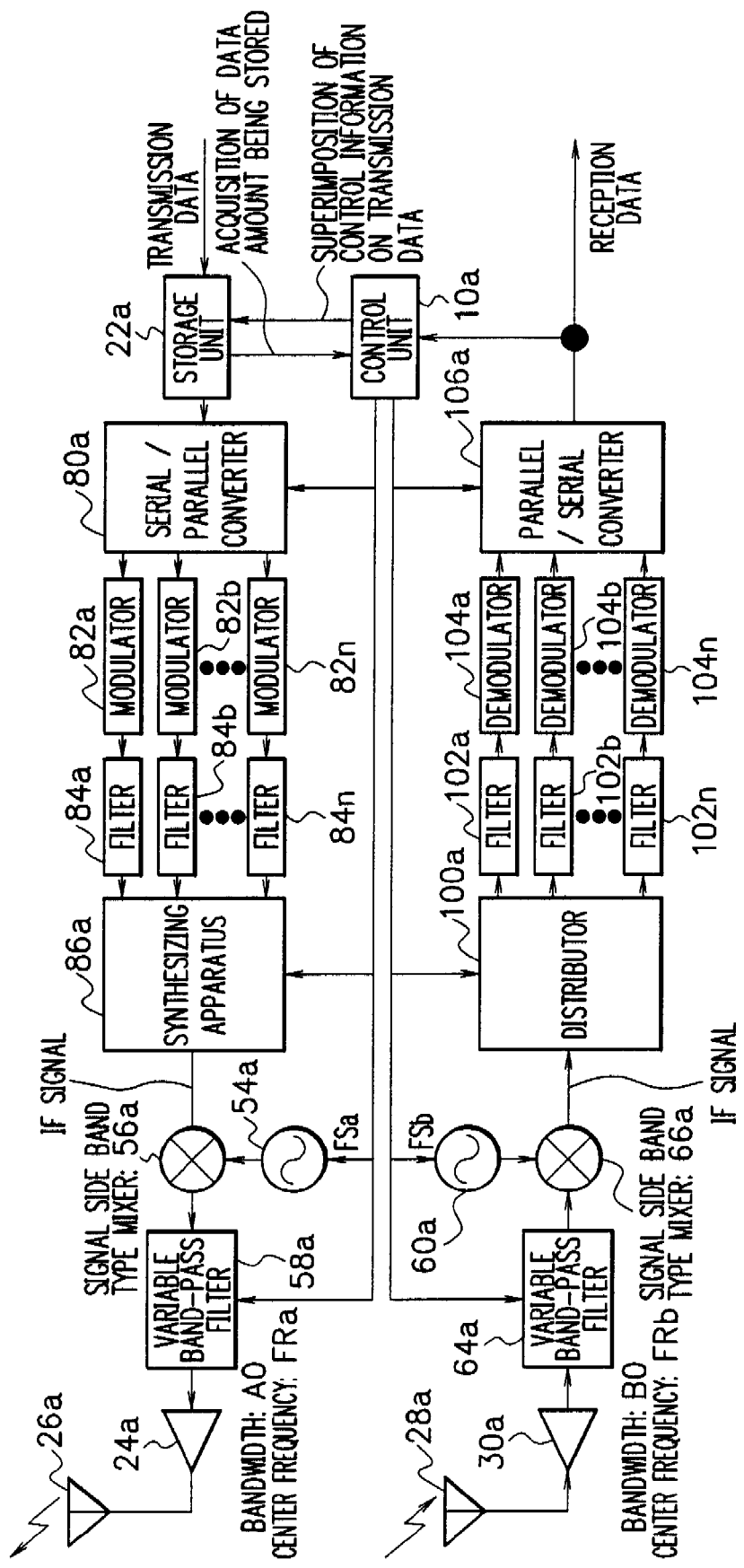
FIG. 10 is a drawing for explaining the composition of the radio equipment in the fifth embodiment.

A, B, C, C Radio equipment
10a, 10b Control unit
12a, 12b, 16a, 16b Variable oscillator
14a, 14b, 18a, 18b Variable band-pass filter
20a, 20b Modulator
32a, 32b Demodulator
50a, 50b IF modulator
68a, 68b IF demodulator
52a, 52b, 54a, 54b, 60a, 60b, 62a, 62b Variable oscillator
56a, 56b, 66a, 66b Single side band type mixer
58a, 58b, 64a, 64b Variable band-pass filter
70a-70n Fixed band-pass filter
74a-74n Fixed oscillator
71 Selector
72 Switch
80a Serial/parallel converter
82a-82n Modulator
84a-84n, 102a-102n Filter
86a Synthesizing apparatus
100a Distributor
104a-104n Demodulator
106a Parallel/serial converter

The invention claimed is:

1. A frequency bandwidth control method for controlling a frequency bandwidth when a first communication apparatus and a second communication apparatus communicate with full duplex by using two or more divided frequency bandwidths within a previously allocated whole frequency bandwidth, wherein frequency bandwidths which said first communication apparatus and said second communication apparatus use at data transmission are different frequency bandwidths, the bandwidth control method comprising the steps of:

a bandwidth presumption step for presuming a first bandwidth required by said first communication apparatus at data transmission and a second bandwidth required by said second communication apparatus at data transmission;

a bandwidth comparison step for comparing said first bandwidth with a first bandwidth used which said first communication apparatus currently uses and comparing said second bandwidth with a second bandwidth used which said second communication apparatus currently uses; and a bandwidth used determination step for determining a third bandwidth used by said first communication apparatus at data transmission and a fourth bandwidth used by said second communication apparatus at data transmission according to comparison results obtained by said bandwidth comparison step, wherein said determining said third bandwidth and said fourth bandwidth comprises:

if said first bandwidth is less than said first bandwidth used and said second bandwidth is greater than said second bandwidth used, determining said third bandwidth to be equal to said first bandwidth and determining said fourth bandwidth to be equal to said whole frequency bandwidth less said third bandwidth, if said first bandwidth is greater than said first bandwidth used and said second bandwidth is less than said second bandwidth used, determining said fourth bandwidth to be equal to said second bandwidth and determining said third bandwidth to be equal to said whole frequency bandwidth less said fourth bandwidth, if said first bandwidth is greater than said first bandwidth used and said second bandwidth is greater than said second bandwidth used, determining said third bandwidth and said fourth bandwidth such that a ratio of said first bandwidth to said second bandwidth is the same as a ratio of said third bandwidth to said fourth bandwidth, and if said first bandwidth is less than or equal to said first bandwidth used and said second bandwidth is less than or equal to said second bandwidth used, determining said third bandwidth to be equal to said first bandwidth used and determining said fourth bandwidth to be equal to said second bandwidth used;

a first communication step for transmitting data by using said third bandwidth and for receiving data by using said fourth bandwidth, in said first communication apparatus; and a second communication step for transmitting data by using said fourth bandwidth and for receiving data by using said third bandwidth, in said second communication apparatus.

2. The bandwidth control method according to claim 1, wherein in said bandwidth presumption step, said first communication apparatus presumes said first bandwidth and said second communication apparatus presumes said second bandwidth.

3. The bandwidth control method according to claim 1, wherein in said bandwidth comparison step, said first communication apparatus acquires said second bandwidth from said second communication apparatus, said first communication apparatus compares said first bandwidth with said first bandwidth used and further compares said second bandwidth with said second bandwidth used.

4. The bandwidth control method according to claim 1, wherein in said bandwidth used determination step, said first communication determines said third bandwidth and said fourth bandwidth according to the comparison results.

5. The bandwidth control method according to claim 1, wherein said bandwidth presumption step presumes said first bandwidth and said second bandwidth periodically every predetermined time interval.

6. The bandwidth control method according to claim 1, wherein said bandwidth presumption step presumes said first bandwidth and said second bandwidth only when, in at least either of said first communication apparatus and said second communication apparatus, an amount of data scheduled to be transmitted is less than a predetermined threshold level through a predetermined time.

7. The bandwidth control method according to claim 1, wherein, in at least either of said first communication apparatus and said second communication apparatus, priority is put to data scheduled to be transmitted, and said bandwidth presumption step adds virtual data which are not transmitted actually according to said priority and presumes said first bandwidth and said second bandwidth.

8. The bandwidth control method according to claim 1, wherein said first communication apparatus and said second communication apparatus modulate directly a carrier frequency by a transmission data to allow data transmission.

9. The bandwidth control method according to claim 1, wherein said first communication apparatus and said second communication apparatus perform single side band amplitude modulation of a carrier frequency after an intermediate frequency is modulated by the transmission data to allow data transmission.

10. The bandwidth control method according to claim 1, wherein said first communication apparatus and said second communication apparatus adjust a number of carriers for multicarrier modulation utilizing multicarrier modulation and based on said third bandwidth and said fourth bandwidth to allow data transmission.

11. The bandwidth control method according to claim 1, wherein in said bandwidth used determination step determining said third bandwidth further comprises determining a center frequency of said third bandwidth, and determining said fourth bandwidth further comprises determining a center frequency of said fourth bandwidth.

12. A communication apparatus for performing data transmission by controlling frequency bandwidth when data communication is performed with an other communication apparatus with full duplex by using two or more divided frequency bandwidths within a previously allocated whole frequency bandwidth, wherein frequency bandwidths which said communication apparatus and said other communication apparatus use at data transmission are different frequency bandwidths, the communication apparatus comprising:

bandwidth presumption means for presuming a first bandwidth which is required by said communication apparatus at data transmission;

bandwidth acquisition means for acquiring a second bandwidth from said other communication apparatus which is required by said other communication apparatus at data transmission;

bandwidth comparison means for comparing said first bandwidth with a first bandwidth used which said first communication apparatus currently uses, and comparing said second bandwidth with a second bandwidth used which said second communication apparatus currently uses; and bandwidth used determination means for determining a third bandwidth used by said first communication apparatus at data transmission and a fourth bandwidth used by said second communication apparatus at data transmission according to comparison results obtained by said bandwidth comparison means, wherein said third bandwidth and said fourth bandwidth are determined such that:

if said first bandwidth is less than said first bandwidth used and said second bandwidth is greater than said second bandwidth used, said third bandwidth is determined to be equal to said first bandwidth and said fourth bandwidth is determined to be equal to said whole frequency bandwidth less said third bandwidth, if said first bandwidth is greater than said first bandwidth used and said second bandwidth is less than said second bandwidth used, said fourth bandwidth is determined to be equal to said second bandwidth and said third bandwidth is determined to be equal to said whole frequency bandwidth less said fourth bandwidth, if said first bandwidth is greater than said first bandwidth used and said second bandwidth is greater than said second bandwidth used, said third bandwidth and said fourth bandwidth are determined such that a ratio of said first bandwidth to said second bandwidth is the same as a ratio of said third bandwidth to said fourth bandwidth, and if said first bandwidth is less than or equal to said first bandwidth used and said second bandwidth is less than or equal to said second bandwidth used, said third bandwidth is determined to be equal to said first bandwidth used and said fourth bandwidth is determined to be equal to said second bandwidth used, wherein said communication apparatus transmits data by using said third bandwidth and receives data by using said fourth bandwidth and said other communication apparatus transmits data by using said fourth bandwidth and receives data by using said third bandwidth.

13. The communication apparatus according to claim 12, wherein said bandwidth used determination means further determines said third bandwidth, a center frequency of said third bandwidth and a center frequency of said fourth bandwidth.

14. The communication apparatus according to claim 13 comprising:

transmission means for transmitting data to said other communication apparatus using said third bandwidth and the center frequency of said third bandwidth; and reception means for receiving a data from said other communication apparatus using said fourth bandwidth and the center frequency of said fourth bandwidth.

15. The communication apparatus according to claim 12, wherein said bandwidth presumption means presumes periodically said first bandwidth every predetermined time interval.

16. The communication apparatus according to claim 12, wherein said bandwidth presumption means presumes said first bandwidth only when, in at least either of said communication apparatus and said other communication apparatus, an amount of data scheduled to be transmitted is less than a predetermined threshold level through a predetermined time.

17. The communication apparatus according to claim 12, wherein, in at least either of said communication apparatus and said other communication apparatus, priority is put to data scheduled to be transmitted, and said bandwidth presumption means adds virtual data which are not transmitted actually according to said priority and presumes said first bandwidth.

18. The communication apparatus according to claim 12, wherein a carrier frequency is directly modulated by transmission data to allow data transmission.

19. The communication apparatus according to claim 12, wherein a carrier frequency is single side band amplitude modulated after a intermediate frequency is modulated by the transmission data to allow data transmission.

20. The communication apparatus according to claim 12, wherein a number of carriers for multicarrier modulation is adjusted utilizing multicarrier modulation and based on said third bandwidth and said fourth bandwidth to allow data transmission.

* * * * *

UNITED STATES PATENT AND TRADEMARK OFFICE
CERTIFICATE OF CORRECTION

| | | |
|---|---|---|
| PATENT NO. | : 8,045,580 B2 | Page 1 of 1 |
| APPLICATION NO. | : 11/910572 | |
| DATED | : October 25, 2011 | |
| INVENTOR(S) | : Yasuhiro Hamada et al. | |

It is certified that error appears in the above-identified patent and that said Letters Patent is hereby corrected as shown below:

In the Claims

Column 21, Line 10: In Claim 13, after "determines" delete "said third bandwidth,"

Signed and Sealed this
Fifth Day of August, 2014

Michelle K. Lee
*Deputy Director of the United States Patent and Trademark Office*